(12) United States Patent
Hamatani et al.

(10) Patent No.: US 6,751,862 B2
(45) Date of Patent: Jun. 22, 2004

(54) METHOD OF MAKING AN ELECTRONIC DEVICE

(75) Inventors: Junichi Hamatani, Shiga (JP); Satoshi Tsuruhara, Shiga (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 128 days.

(21) Appl. No.: 09/895,897

(22) Filed: Jun. 29, 2001

(65) Prior Publication Data

US 2001/0054233 A1 Dec. 27, 2001

Related U.S. Application Data

(62) Division of application No. 09/134,041, filed on Aug. 14, 1998, now abandoned.

(30) Foreign Application Priority Data

Sep. 19, 1997 (JP) .............................................. 9-254463

(51) Int. Cl.⁷ .......................... H01R 43/18; H05K 13/04
(52) U.S. Cl. .............................. 29/854; 29/612; 29/613; 29/619; 29/881; 29/834; 29/837; 338/276; 338/233; 439/260; 439/267; 439/637; 439/787
(58) Field of Search ......................... 29/612, 613, 619, 29/854, 881, 834, 610.1, 836, 837, 876; 439/267, 260, 637, 787, 622; 338/276, 233, 202

(56) References Cited

U.S. PATENT DOCUMENTS 4,106,841 A * 8/1978 Vladic ..................... 439/637 X
5,795,171 A * 8/1998 Bernardini .................. 439/260

FOREIGN PATENT DOCUMENTS

| CN | 1231055 A | 10/1999 |
|---|---|---|
| JP | 59-180404 | 12/1984 |
| JP | 63-219101 | 9/1988 |
| JP | 02-136302 | 11/1990 |
| JP | 9-69415 | 3/1997 |

OTHER PUBLICATIONS

Bos et al, "A New Center–Tapped Medium Power Microfilm Resistor", IEEE Transactions on Parts, Hybrids, and Packaging, Vo PHP–12, No. 3, Sep. 1976, pp. 212–217.*

* cited by examiner

*Primary Examiner*—A. Dexter Tugbang
(74) *Attorney, Agent, or Firm*—Bever Weaver & Thomas LLP

(57) ABSTRACT

An electronic device containing an electronic element such as a thermistor element is produced first by providing the element with electrodes formed on its two main surfaces facing outward away from each other, at least two terminals and a casing. Each terminal has a contact part for contacting one of the electrodes and an extended part extending from the contact part. The contact part of at least one of the terminals is elastic and bendable. The terminals and the electronic element are inserted into the casing either sequentially or simultaneously as an assembly in any of the ways such that the electrodes on the electronic element are not rubbed directly against the contact parts of the terminals. This may be done by disposing flexible guide plates over the contact parts such that the electrodes will glide over these guide plates as the electronic element is inserted after the terminals are installed inside the casing. Alternatively, the contact parts may be contacted to the electrodes to form an assembly outside the casing which is made divisible into tow parts, and the assembly is placed into one of the divided parts and the two parts of the casing are joined together.

5 Claims, 4 Drawing Sheets

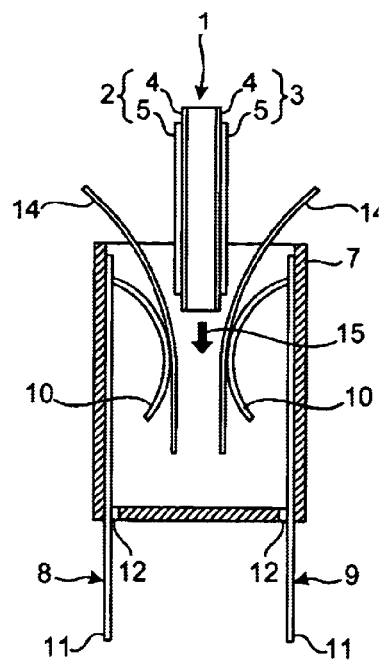
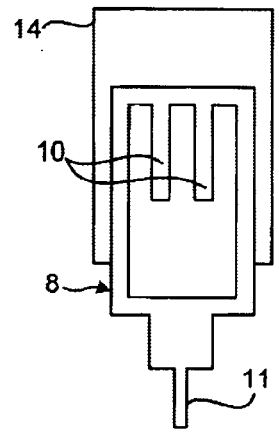
Fig. 1
Fig. 2
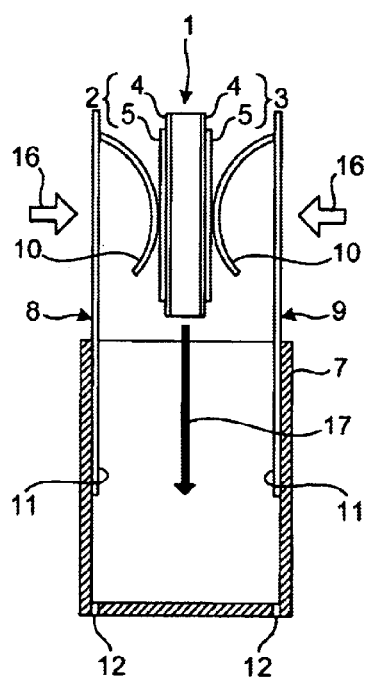
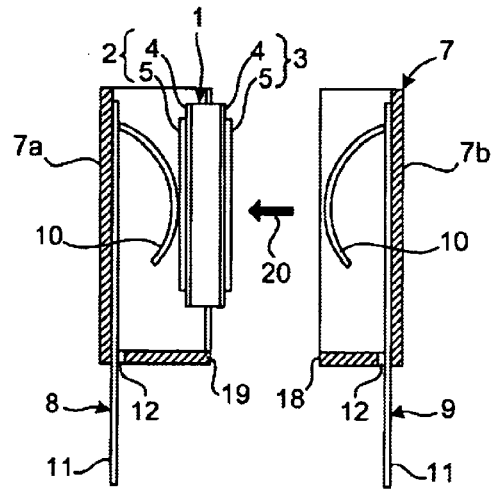
Fig. 3
Fig. 4

METHOD OF MAKING AN ELECTRONIC DEVICE

This is a divisional of application Ser. No. 09/134,041 filed Aug. 14, 1998, now abandoned.

BACKGROUND OF THE INVENTION

This invention relates to a method of making an electronic device of the type having its electronic element contained inside a casing such that it makes electrical contacts through terminals having an elastic spring-like contact part. In particular, this invention relates to a method of inserting such an electronic element and its terminals into a casing.

One of the examples of such an electronic device that is of interest from the point of view of this invention is a device having a thermistor with a positive temperature coefficient (PTC) as its electronic element contained inside a casing. FIGS. 8A and 8B show an example of prior art thermistor element 1 characterized as having two main surfaces facing outward away from each other and electrodes 2 and 3 formed thereon. Silver used to be the material for forming such electrodes, but silver tends to cause the phenomenon of migration, especially when used under a dewing condition which is likely to cause migration and a short circuit, damaging the thermistor element 1. For this reason, it has been known to form the electrodes 2 and 3, as shown in FIGS. 8A and 8B, by first providing a first electrode layer 4 and then a second electrode layer 5 thereon such that peripheral areas of the first electrode layer 4 remain exposed, the first electrode 4 layer comprising a metallic material such as nickel that can provide an ohmic contact but is not likely to cause a migration and the second electrode layer 5 comprising silver. Since the first and second electrode layers 4 and 5 thus formed remain nearly at the same potential, even if the silver of the second electrode layer 5 is ionized, the electrostatic force on the ionized silver is extremely weak, not significantly contributing to the migration of the silver ions.

FIG. 9 shows a prior art thermistor device 6 obtained by putting a thermistor element 1 as shown in FIGS. 8A and 8B inside a casing 7 made, for example, of a resin, glass, ceramic or metal material. Since the thermistor element 1 is a heat-producing element and reaches a high temperature when in operation, it is commonly made and sold in the form of such a device 6. The device 6 also includes two terminals 8 and 9 made of stainless steel or a copper alloy, each having a contact part 10 contacting a corresponding one of the electrodes 2 and 3 of the thermistor element 1 and an extended part 11 extending from the corresponding contact part 10. The contact parts 10 are each formed so as to serve as a spring, adapted to elastically contact the electrodes 2 and 3.

The casing 7 has throughholes 12 formed therethrough, and the thermistor element 1 and the contact parts 10 of the terminals 8 and 9 are contained inside the casing 7 such that the thermistor element 1 is sandwiched and supported between and by the contact parts 10 of the terminals 8 and 9 which pass through the throughholes 12 through the casing 7, leaving the extended parts 11 extending outside.

According to common methods of producing a thermistor device thus structured, the terminals 8 and 9 are first set at specified positions inside the casing 7 and the thermistor element 1 is then inserted between the contact parts 10 of the two terminals 8 and 9. When the thermistor element 1 is thus inserted between the contact parts 10, the contact parts 10 are deformed against its elastic spring force such that the gap therebetween is increased and that they can admit the thermistor element 1 therebetween while they remain in contact with the thermistor element 1. In other words, the electrodes 2 and 3 are rubbed against the contact parts 10 as the thermistor element 1 is inserted into the casing 7 inside which the terminals 8 and 9 are already installed. This tends to scratch and damage the electrodes 2 and 3, as shown schematically at 13 in FIG. 10.

One of the factors contributing to the scratches on the electrode surface is the shape of the contact parts 10. In order to minimize the heat conduction from the thermistor element 1 to the terminals 8 and 9, the width of the terminals 8 and 9 is reduced at their contact parts 10 as shown in FIG. 11 so as to reduce as much as possible the area through which the contact parts 10 contact the electrodes 2 and 3. These contact areas are much smaller than the surface area of the electrodes 2 and 3 and hence the pressure applied by the contact parts 10 on (or the force on a unit area of) the electrodes 2 and 3 is relatively large, or large enough to scratch the electrodes 2 and 3. Such scratches (as shown at 13) usually affect the quality and/or the function of the electronic element (such as the thermistor element 1). In the case of the thermistor element 1 with a particular structure as described above, the scratches 13 may extend beyond the second electrode layer 5 and may reach the exposed part of the first electrode layer 4 surrounding the second electrode layer 5. This has the undesirable effect of effectively causing the second electrode layer 5 to come closer through the scratch 13 to the main surface of the thermistor element 1. If the thermistor device 6 having such scratches 13 is used under a dewing condition, the silver of the second electrode layer 5 may begin to migrate around the scratch 13.

Worse still, since a relatively large force is applied to the outer periphery of the thermistor element 1 when it is being inserted into the casing 7, the outer periphery of the thermistor element 1 may develop cracks.

SUMMARY OF THE INVENTION

It is therefore an object of this invention to provide a method of making an electronic device of the type described above with which the problems as described above can be overcome.

Methods embodying this invention, with which the above and other objects can be accomplished, may be characterized broadly as comprising the steps of providing an electronic element such as a thermistor element with electrodes formed on its two mutually parallel outwardly facing main surfaces, at least two terminals and a casing as described above, and inserting the electronic element and the terminals into the casing either simultaneously or sequentially such that the electrodes are not rubbed by the contact part of either of the terminals. There are many ways to prevent such rubbing of the electrodes by the contact parts of the terminals. One of the ways is to insert the terminals first and then cover their contact parts with flexible planar guide plates such that the electrodes will glide over them as the electronic element is inserted. Another method is to sandwich the electronic element between the terminals with the contact parts of the latter contacting the electrodes on the main surfaces of the former to thereby preliminarily form an assembly consisting of the electronic element and the contacting terminals and then to insert this assembly into the casing. For this purpose, the casing may be made divisible into halves such that the pre-formed assembly is inserted into one of them and then the two halves are joined together. Alternatively, the casing may be made divisible into a tubular main body with one open surface and a lid with throughholes for closing this open surface. The terminals are preliminarily passed through these throughholes and supported by the lid. With one or both of these throughholes appropriated configured, one or both of the terminals passing therethrough can be tilted such that they can be opened as the electronic element is inserted and then closed to form an assembly which is then inserted as a whole into the main body. These methods are also applicable for making an electronic device containing two or more electronic elements inside a casing. The electrodes on the electronic element may be of a layered structure with the inner layer made of a metal less likely to general migration than the metal material of the outer layer.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a sectional view of a thermistor device being produced by a method according to a first embodiment of this invention;

FIG. 2 is a front view of a portion of FIG. 1 to show how a guide plate overlaps a corresponding one of the electrodes;

FIG. 3 is a sectional view of a thermistor device being produced by another method according to a second embodiment of the invention;

FIG. 4 is a sectional view of a thermistor device being produced by still another method according to a third embodiment of the invention;

Throughout herein, like components are indicated by the same numerals even where they are components of different devices and may not necessarily be described repetitiously.

DETAILED DESCRIPTION OF THE INVENTION

Figure 5A:
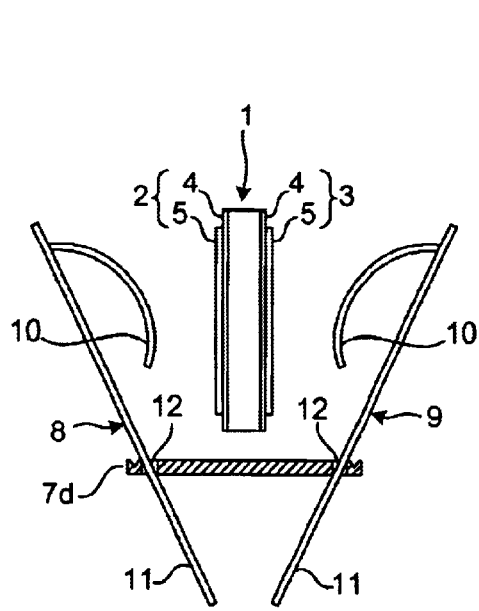
FIGS. 5A and 5B are sectional views of a thermistor device at two different times while it is being produced by still another method according to a fourth embodiment of the invention.

The invention is described next by way of examples of a method for making a thermistor device (as an example of an electronic device) as shown at 6 in FIG. 9. For its production, a thermistor element 1 (as an example of an electronic element), two terminals 8 and 9 and a casing 7 are prepared. These components have already been described above and their description will not be repeated.

The method of production includes the step of inserting the thermistor element 1 into the casing 7 and the step of inserting the terminals 8 and 9 into the casing 7, but each of these steps can be carried out in different ways, as will be described below.

According to a first embodiment of the invention shown in FIG. 1, the terminals 8 and 9 are inserted into the casing 7 first and then the thermistor element 1 is inserted. When the thermistor element 1 is inserted into the casing 7, guide plates 14 are each placed between one of the electrodes 2 and 3 of the thermistor element 1 and corresponding one of the contact parts 10 of the terminals 8 and 9. As shown in FIG. 2, the area of each guide plate 14 is greater than the area of each contact part 10 which contacts the electrode 2 or 3, and, in particular, the width of the guide plate 14 is made greater than the width of the contact area of each contact part 10 through which it contacts the electrode 2 or 3. The material and the shape of the guide plates 14 are not intended to limit the scope of this invention. Any thin plate with a smooth surface can serve the purpose of this invention. Thin plates of stainless steel which can be easily bent in the direction of the thickness may be utilized advantageously.

With the guide plates 14 positioned as shown in FIG. 1, the thermistor element 1 is inserted into the casing 7 as indicated by arrow 15 until the electrodes 2 and 3 reach the positions opposite to and facing the contact parts 10 of the terminals 8 and 9. After the thermistor element 1 and the terminals 8 and 9 are properly positioned, the guide plates 14 are pulled out.

According to this method, the guide plates 14 serve to prevent direct contacts between the contact parts 10 of the terminals 8 and 9 with the electrodes 2 and 3 while the thermistor element 1 is inserted into the casing 7. Because the contact parts 10 of the terminals 8 and 9 are already positioned opposite to the second electrode layers 5 of the electrodes 2 and 3 when the guide plates 14 are pulled out, the thermistor device 6 can be assembled without causing any scratches as shown at 13 in FIG. 10.

The electrodes 2 and 3 are rubbed against the guide plates 14 when the electronic element 1 is inserted and when the guide plates 14 are pulled out, but since the area of the guide plates 14 is greater than the contact areas of the contact parts 10 with the electrodes 2 and 3, as explained above, the pressure (force per unit area) applied on the contact surface between the electrodes 2 and 3 and the guide plates 14 is much smaller than that between the electrodes 2 and 3 and the contact parts 10 in the case of a prior art method. Thus, the guide plates 14 do not cause any scratches although they rub against the electrodes 2 and 3.

Since the guide plates 14 also serve to allow the thermistor element 1 to be inserted smoothly, no large external force is applied to the peripheral parts of the thermistor element 1. Thus, the possibility of developing cracks along the periphery of the thermistor element 1 can also be reduced.

In order to measure the effect of the method of the present invention described above, a dewing cycle test was carried out by producing both test thermistor devices by the method described above and comparison devices with scratched electrodes by a prior art method of production. These thermistor devices of both kinds were cooled at a low temperature of 0° C. for a few minutes and then brought under a high-temperature, high-humidity condition of 40° C. and 95% RH for forming dews thereon. The test was carried out such that a current would be passed only when dews were formed. Table 1 shows the frequency of occurrence of migration per sample as the cycle number was increased from 1 to 20 to 100 to 1000.

TABLE 1

| Cycle Number | 1 | 20 | 100 | 1000 |
| --- | --- | --- | --- | --- |
| Test Samples | 0/5 | 0/5 | 0/5 | 0/5 |
| Comparison Samples | 0/5 | 5/5 | 5/5 | 5/5 |

Table 1 shows that no migration was observed on any of the comparison samples if the cycle number was 1 but that migration was observed on all of the comparison samples if the cycle number was 20 or over. By comparison, generation of migration was not observed on any of the test samples although the cycle number reached 1000. This indicates that the method of present invention as described above can prevent migrations very effectively.

Figure 9:
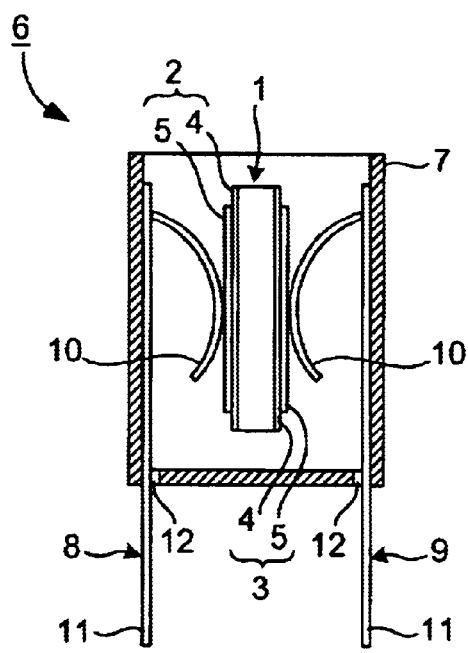
FIG. 9 is a sectional view of a prior art thermistor device having the thermistor element of FIGS. 8A and 8B contained inside a casing.

FIG. 3 shows a thermistor device as shown at 6 in FIG. 9 in the course of being produced by another method according to a second embodiment of this invention. By this method, the step of inserting the thermistor element 1 into the casing 7 and that of inserting the terminals 8 and 9 into the casing 7 are carried out at the same time. This is done by first contacting the contact parts 10 of the terminals 8 and 9 respectively against the electrodes 2 and 3 of the thermistor element 1 and then inserting the assembly of the thermistor element 1 and the terminals 8 and 9 together into the casing 7 as shown by the black arrow 17 while elastically deforming the contact parts 10 as shown by white arrows 16 so as to reduce the separation between the two terminals 8 and 9. It is important, when using this method, to be careful to cause the contact parts 10 of the terminals 8 and 9 to contact the electrodes 2 and 3 of the thermistor element 1 such that the contact parts 10 will not touch the exposed peripheral parts of the first electrode layers 5. It is also important to be careful not to adversely affect the elastic property of the contact parts 10 when the contact parts 10 of the terminals 8 and 9 are elastically deformed.

Figure 10:
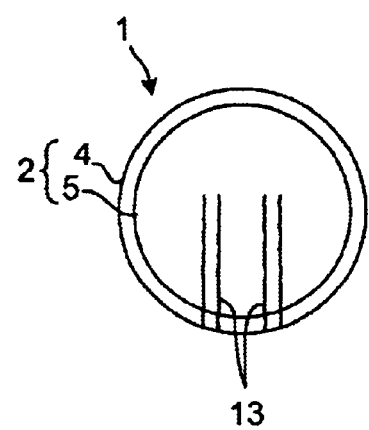
FIG. 10 is a front view of the prior art thermistor element of FIGS. 8A and 8B with an electrode surface scratched as it was inserted into a casing.
Figure 11:
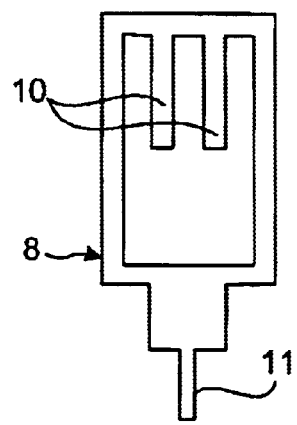
FIG. 11 is a front view of one of the terminals shown in FIG. 9.

By this method, too, the electrodes 2 and 3 are not rubbed against the contact parts 10 of the terminals 8 and 9 as the thermistor element 1 is inserted into the casing 7 because the thermistor element 1 and the terminals 8 and 9 are in a fixed positional relationship, and hence a thermistor device as shown in FIG. 9 can be assembled without causing any scratches as shown at 13 in FIG. 10. Moreover, since no external force is applied on the peripheral parts of the thermistor element 1 as the latter is being inserted into the casing 7, no cracks are generated along the periphery of the thermistor element 1.

FIG. 4 shows a thermistor device as shown at 6 in FIG. 9 in the course of being produced by still another method according to a third embodiment of this invention. By this method, the casing 7 is divisible into a first half 7a and a second half 7b across a dividing plane parallel to the main surfaces of the thermistor element 1 which is inserted thereinto. The two halves 7a and 7b of the casing 7 are respectively provided with a V-shaped protrusion 19 and a similarly V-shaped groove 18 which are mutually engageable such that the two halves 7a and 7b can be tightly joined together.

When the thermistor element 1 and the two terminals 8 and 9 are inserted into the casing 7 thus divisible, one of the terminals (say, the terminal 8) and the thermistor element 1 are firstly inserted into either half of the casing 7 (say, the first half 7a) such that contact part 10 of the terminal 8 is already in contact with the electrode 2 of the thermistor element 1, as shown in FIG. 4. Thereafter, the other terminal 9 is positioned such that its contact part 10 will contact the other electrode 3 of the thermistor element 1 and the second half 7b is joined to the first half 7a as shown by arrow 20. In this method, the terminal 9 may preferably be supported preliminarily by the second half 7b of the casing 7.

Neither by this method do the contact parts 10 rub against the electrodes 2 and 3 as the thermistor element 1 is inserted into the casing 7. Since one of the terminals 8, the thermistor element 1 and the other terminal 9 are sequentially assembled while the exposed parts of the first electrode layers 5 are kept away from the contact parts 10 of the terminals 8 and 9, scratches as shown at 13 in FIG. 10 are not made on the electrodes 2 and 3. Since no external force is applied on the peripheral parts of the thermistor element 1 throughout the process, no cracks are generated along the periphery of the thermistor element 1.

Figure 5B:
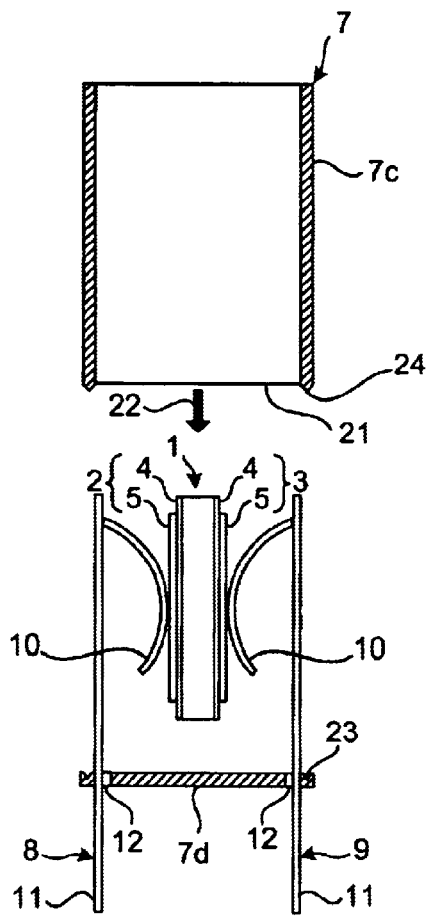

FIGS. 5A and 5B show a thermistor device as shown at 6 in FIG. 9 at two points in time in the course of being produced by still another method according to a fourth embodiment of this invention. By this method, the casing 7 is made divisible into a main part 7c and a lid 7d. The main part 7c is for surrounding and containing therein the thermistor element 1 and the two terminals 8 and 9 and has at least one open surface 21. The lid 7d is for closing this open surface 21 of the main part 7c and has throughholes 12 for admitting therethrough the extended parts 11 of the terminals 8 and 9 to thereby support the terminals 8 and 9. The thermistor element 1 and the two electrodes 8 and 9 are inserted into the casing 7 at the same time, as by the method according to the second embodiment of this invention.

Firstly, the contact parts 10 of the terminals 8 and 9 are brought into contact with the electrodes 2 and 3 of the thermistor element 1. This is done by increasing the gap between the contact parts 10 while the terminals 8 and 9 are supported by the lid 7d and then positioning the thermistor element 1 between the two contact parts 10, as shown in FIG. 5A. Thereafter, the elastic contact parts 10 are elastically deformed, as shown in FIG. 5B, as the gap between the contact parts 10 is narrowed such that the electrodes 2 and 3 come into contact with the contact parts 10.

The throughholes 12 through the lid 7d are preferably provided with a sufficient clearance such that the tilting angles of the terminals 8 and 9 supported by the lid 7d can be varied as the gap between the contact parts 10 is changed gradually. Such a clearance may be provided to only one of the throughholes 12. Alternatively, the extended parts 11 of the terminals 8 and 9 may be made flexible such that the gap between the two contact parts 10 can be increased by bending their flexible extended parts 11.

The main part 7c and the lid 7d of the casing 7 are brought together, as indicated by arrow 22 in FIG. 5B, while the terminals 8 and 9 remain supported by the lid 7d and the gap between the terminals 8 and 9 is made narrower by bending their contact parts 10 such that the thermistor 1 and the terminals 8 and 9 are inserted together inside the main part 7c until and main part 7c and the lid 7d are engaged together. The main part 7c and the lid 7d of the casing 7 are respectively provided with a V-shaped protrusion 24 and a similarly V-shaped groove 23 which are mutually engageable such that they can be tightly joined together.

By this method, too, as by the method according to the second embodiment of the invention, the thermistor element 1 and the two terminals 8 and 9 are already in a fixed positional relationship when they are inserted into the main part 7c of the casing 7, and hence the contact parts 10 do not rub the electrodes 2 and 3 during the insertion process. Thus, a thermistor device as shown at 6 in FIG. 9 can be assembled without producing any scratches as shown at 13 in FIG. 10 on the electrodes 2 and 3. Since no external force is applied on the peripheral parts of the thermistor element 1 throughout the process, no cracks are generated along the periphery of the thermistor element 1.

Figure 6:
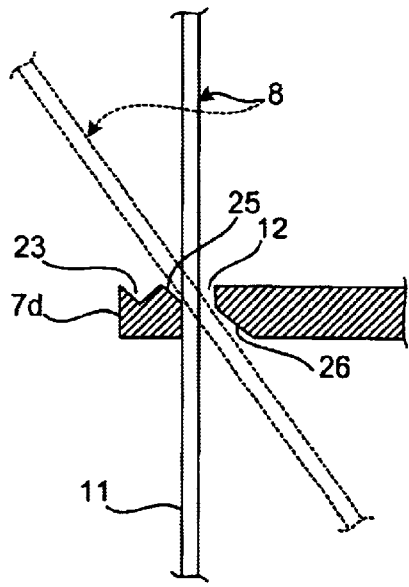
FIG. 6 is a sectional view of a portion of a thermistor device being produced by still another method according to a fifth embodiment of the invention.

FIG. 6 shows a variation on the fourth embodiment ("the fifth embodiment") of the invention described above with reference to FIGS. 5A and 5B characterized by an improved shape of the throughholes 12 through the lid 7d of the casing 7. As shown enlarged in FIG. 6, the throughholes 12 are formed so as to have not only an extra clearance but also sloped surfaces 25 and 26 such that the terminals 8 and 9 supported by the lid 7d can be tilted by an even larger angle, as indicated by a broken line. This means that the gap between the two contact parts 10 can be increased even more without causing any unreasonable deformation such that even a thicker thermistor element can be sandwiched therebetween without having its electrodes scratched by the contact parts 10. The ability to increase the gap between the contact parts 10 also means that the thermistor element 1 can be more easily positioned therebetween and hence that the overall efficiency of the production process is thereby improved.

The sloped surfaces 25 and 26 may be provided to only one of the throughholes 12.

Figure 7:
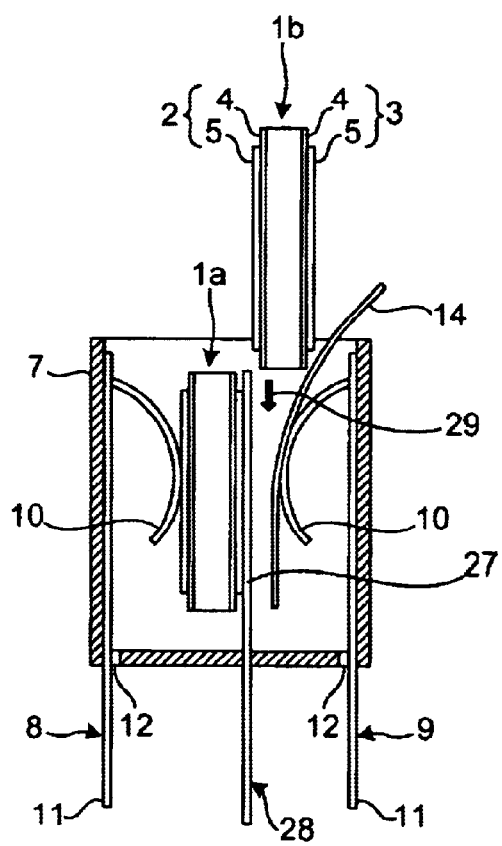
FIG. 7 is a sectional view of a thermistor device being produced by still another method according to a sixth embodiment of the invention.
Figure 8A:
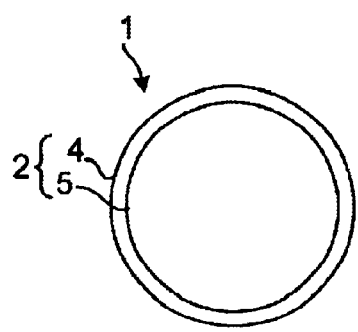
FIG. 8A is a front view of a prior art thermistor element.
Figure 8B:
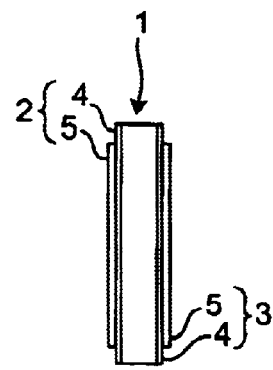
FIG. 8B is its side view.

FIG. 7 shows another thermistor device in the course of being produced by still another method according to a sixth embodiment of this invention. This method is similar to the first embodiment described above with reference to FIG. 1, but the thermistor device to be produced is characterized as having a plurality of thermistor elements. For the convenience of illustration, FIG. 7 shows a method of making a thermistor device with only two thermistor elements 1a and 1b and one extra terminal 28 with a planar contact part 27 supported by the casing 7, in addition to the terminals 7 and 8 shown in FIG. 1.

According to the sixth embodiment, as according to the first embodiment, the terminals 8, 9 and 28 are inserted into the casing 7 first and then the thermistor elements 1a and 1b are inserted. FIG. 7 shows a point in time where one of the thermistor elements 1a has already been inserted and the other thermistor element 1b is about to be inserted. Since the thermistor elements 1a and 1b are inserted in similar manners, only the insertion of the second thermistor element 1b will be described next.

As shown in FIG. 7, before the thermistor element 1b is inserted into the casing 7, a guide plate 14 is disposed between the electrode 3 thereon and the contact part 10 of the terminal 9 which has already been inserted into the casing 7. The thermistor element 1b is then inserted into the casing 7, as shown by arrow 29, until its electrodes 2 and 3 reach positions opposite respectively to the contact parts 27 and 10 of the terminals 28 and 9. After the thermistor element 1b and the terminals 28 and 9 are properly positioned, the guide plate 14 is pulled out. The method according to the sixth embodiment of the invention also has the same effects as the method according to the first embodiment described above but is particularly of interest because the present invention is hereby shown to be equally applicable to the production of a device wherein only one of the two terminals sandwiching an electronic element has an elastically bendable contact part, the other terminal having a non-elastic contact part.

The invention has been described above with reference to only a limited number of examples but these examples are not intended to limit the scope of the invention. Although not described separately, any of the methods according to the second through fifth embodiments of the invention can be applied to the production of an electronic device containing two or more electronic elements such as the subject matter of the sixth embodiment. It also goes without saying that the invention is not limited to thermistor devices encapsulating PTC thermistor elements. The encapsulated electronic element may be a negative temperature coefficient thermistor, or a heat-generating element of any other kind. Furthermore, it can be any electronic element as long as it has electrodes formed on its main surfaces which are substantially parallel to each other and facing outward oppositely away from each other. Neither are the physical properties of the two electrode layers 4 and 5 intended to limit the scope of the invention. The invention is equally applicable to the production of an electronic device with an electronic element having electrodes of a single-layer structure.

In summary, the present invention introduces a method of assembling an electronic device by inserting an electronic element and terminals into a casing without having the electrodes scratched by the elastic contact parts of the terminals.

What is claimed is:

1. A method of making an electronic device, said method comprising the steps of:

providing an electronic element having two main surfaces which face outward away from each other and electrodes formed individually on said main surfaces;

providing at least two terminals each having a contact part for contacting one of said electrodes and an extended part extending from said contact part, the contact part of at least one of said terminals being an elastic contact part for elastically contacting a corresponding one of said electrodes;

providing a casing for containing therein said electronic element and the contact parts while said electronic element is sandwiched between said terminals with each of said contact parts contacting the corresponding electrode and the extended parts extending out of said casing, said casing including a main part and a lid, said main part having at least one open surface and serving to surround said electronic element and the contact parts, said lid having obliquely sloped throughholes, serving to allow the extended parts of said terminals to pass therethrough and to support said electronic element and said terminals, and being engageable to said main part to thereby close said open surface of said main part, at least one of said throughholes having a an obliquely sloped clearance which is sufficiently large to allow one of said terminals passing therethrough at an angle with respect to said lid and being supported by said lid to vary said angle;

inserting said electronic element into said casing; and inserting said terminals into said casing, wherein the steps of inserting said electronic element and said terminals are carried out without having either of said electrodes rubbed by said elastic contact part and include the steps of:

setting said electronic element and said terminals in an assembled condition by causing each of said electrodes to be contacted by a corresponding one of the contact parts of said terminals, said terminals having a gap therebetween; and thereafter inserting said electronic element and said terminals into said casing together while maintaining said electronic element and the corresponding contact parts in said assembled condition, and elastically deforming said elastic contact part so as to narrow said gap between said terminals.

2. The method of claim 1 wherein the step of setting said electronic element and said terminals in said assembled condition includes the steps, while said terminals are supported by said lid, of:

increasing a distance of separation between the contact parts;

thereafter positioning said electronic element between said contact parts; and thereafter decreasing said distance of separation between said contact parts;

and wherein the steps of inserting said electronic element and said terminals are carried out while said terminals are supported by said lid and include the step of attaching said lid to said main part.

3. The method of claim 2 wherein the step of increasing said distance of separation between said contact parts includes varying said angle of said one terminal inside said clearance.

4. The method of claim 3 wherein the one throughhole having said clearance has an obliquely sloped inner wall for allowing said angle of said inserted one terminal to be varied more than if said clearance had not said obliquely sloped inner wall.

5. The method of claim 1 wherein said obliquely sloped clearance is such that said angle allows one of said terminals to pass therethrough without having said electrodes scratched by the contact part.

* * * * *